(No Model.)
W. MORROW.
POTATO DIGGER.
No. 469,973. Patented Mar. 1, 1892.
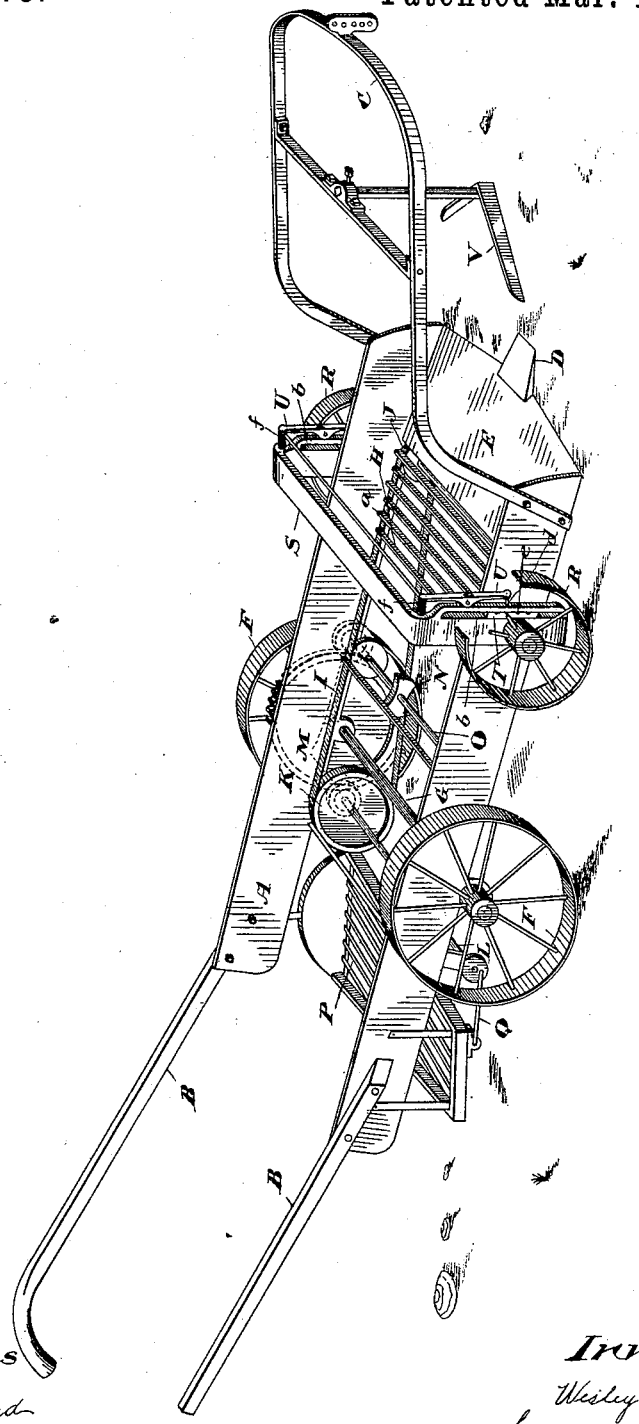
Witnesses
J. C. Woodward
W. G. McMillan
Inventor
Wesley Morrow
by Donald C. Ridout & Co.
Attys.

UNITED STATES PATENT OFFICE.

WESLEY MORROW, OF MILLBROOK, CANADA.

POTATO-DIGGER.

SPECIFICATION forming part of Letters Patent No. 469,973, dated March 1, 1892.

Application filed June 30, 1891. Serial No. 397,979. (No model.)

*To all whom it may concern:*

Be it known that I, WESLEY MORROW, of the village of Millbrook, in the county of Durham, in the Province of Ontario, Canada, have invented a certain new and Improved Potato-Digger, of which the following is a specification.

The object of the invention is to devise a machine which will dig the potatoes, sift the earth from them, and deposit them on the ground outside of the row; and it consists in the peculiar construction, arrangement, and combination of parts hereinafter more particularly described, and then definitely claimed.

The drawing represents a perspective view of my improved potato-digger.

A represents a light frame made of any suitable material and provided with guiding-handles B. A yoke C is fixed to the front of the frame A. To this yoke horses are hitched.

D is a spade-shaped nose extending from the bottom E. This nose D is designed to go into the ground and dig up the potatoes.

The rear of the frame A is supported by the ground-wheels F, connected to the axle G, which is suitably journaled in the frame A.

The grate H is composed of a series of slats connected at each end to an endless belt I. Each belt I is supported at the front of the machine by a suitably-journaled pulley J, and the rear end of each belt is supported by a pulley K. The pulleys K are fixed to a suitably-journaled axle, which derives motion through the gearing M from the axle G. Some of the slats $a$ are above the level of the other slats, so as to hold the potatoes as they are being elevated by the traveling grate.

N is a kicker fixed to a shaft O, which derives motion from the gearing M.

A grate P is flexibly supported on the frame A and derives a vibratory movement by the revolving of the axle L, to which it is connected by a crank-rod Q.

The front wheels R are journaled on axles extending from the frame S. A block T, fixed to the frame A, fits into a slot or guide $b$, formed in the frame S. The lever U is pivoted on the frame S and has a pin $d$, which pin is designed to fit into one of the notches $e$, formed in the block T. When the pin $d$ fits into one of the notches $e$, the frame A is supported by the wheels R. In order to adjust the frame A so that its nose D may project the proper depth in the ground, it is merely necessary to move the lever U so as to withdraw the pin $d$ from the notch $e$. The frame A may be adjusted so that its nose D shall project the proper distance into the ground. A spring $f$ actuates the lever U, so as to hold the pin $d$ in mesh with one of the notches $e$.

V is a scuffler adjustably connected to the yoke C. This scuffler is for the purpose of pushing away the potato-tops, leaving the ground clear for the excavation of the potato by the nose D. As the machine is pulled forward by a horse or otherwise, the potatoes are raised by the nose D and deposited on the bottom E with the earth which may be raised with them. As soon as the potatoes come in contact with the grate H they are elevated by the said grate until they reach the rear end of the machine, when they fall off the grate H and are deposited onto the grate P, which is vibrated, as before described. In passing upon the grate H, which is kept in constant agitation by the kicker N striking its bottom, the earth is shaken from the potatoes through the said grate, leaving the potatoes comparatively clean when they are deposited upon the grate P, from which they slide off onto the ground at the side of the row of potatoes.

What I claim as my invention is—

1. In an improved potato-digger, a vibrating grate having two of its sides and its upper end inclosed, its lower end arranged to deposit the potatoes at one side of the machine and connected on a single pivot by a forked piece and its upper end connected to the frame of the machine at two pivotal points, in combination with a revolving shaft L, operated by the ground-wheels and giving motion to the sieve by means of a crank-rod Q, pivotally connected directly to the upper end of said sieve, all substantially as shown and described.

2. The frame A, having a nose D extending from the bottom E, and the grate H, suitably supported in the frame A, the rear portion of which is carried by the ground-wheels F, in combination with the wheels R, journaled on spindles extending from the frame S, and the lever U, pivoted on the frame S and having a pin $d$, designed to engage with the notches $e$, made in the block T, connected to the frame A, substantially as and for the purpose specified.

Toronto, June 16, 1891.

WESLEY MORROW.

In presence of—
 J. EDW. MAYBEE,
 W. G. MCMILLAN.